DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 277

T904,031

AMMONIUM POLYPHOSPHATES

John F. McCullough, 105 Terrace, Florence, Ala. 35630, and Richard C. Sheridan, 2909 Alexander, Sheffield, Ala. 35660

Filed Mar. 27, 1972, Ser. No. 238,604

Int. Cl. C01b *15/16, 25/26*

U.S. Cl. 423—305

No Drawing. 19 Pages Specification

A method for producing long-chain crystalline ammonium polyphosphates with the general formula $$(NH_4)_mH_{(n-m)+2}P_nO_{3n+1}$$

where $n$ is greater than about 50 and where the ratio $m/n$ is in the range 1.04 to about 0.85 by thermal condensation of ammonium ortho-, pyro-, tripoly-, tetrameta-, or oligophosphates by heating in a stream of ammonia at temperatures of about 200° C. to about 400° C. for a period of about 1 to 16 hours.

Any of three crystalline modifications were prepared by suitable control of the operating conditions. Both ammoniated wet-process and furnace-grade phosphoric acid were used as feed materials, and the products were high-analysis fertilizers with $N$-$P_2O_5$-$K_2O$ grades ranging from 13–67–0 to 14–73–0.